Jan. 21, 1947.    H. G. BUSIGNIES    2,414,444
RECEIVING SYSTEM FOR RADIO INTERCEPTION
Filed July 17, 1941
FIG. 1.
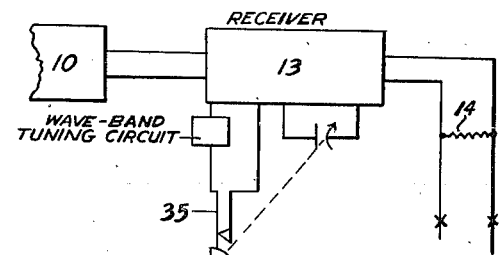
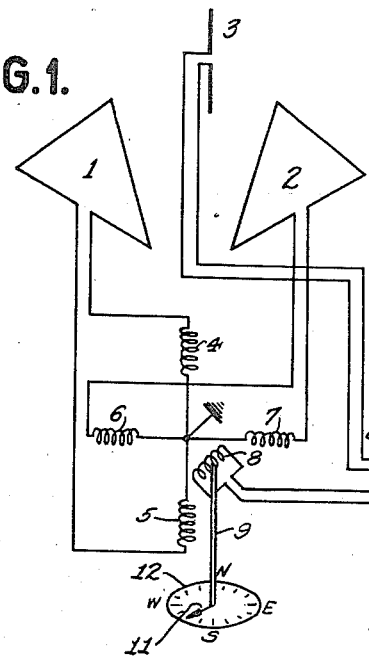
FIG. 3.
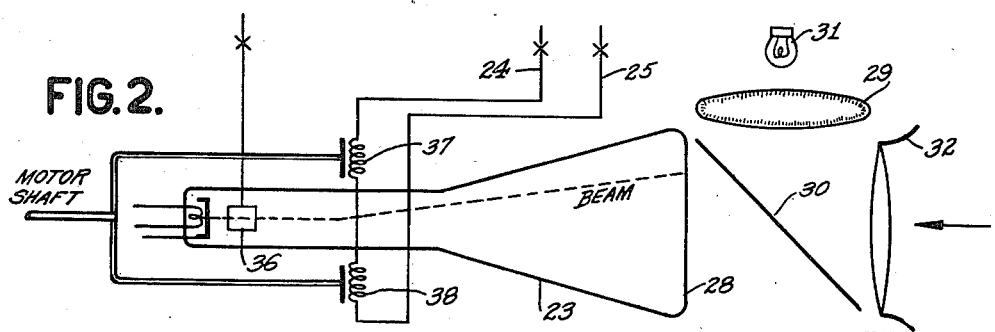
FIG. 2.
INVENTOR
HENRI G. BUSIGNIES
BY
ATTORNEY Patented Jan. 21, 1947

2,414,444

UNITED STATES PATENT OFFICE 2,414,444

RECEIVING SYSTEM FOR RADIO INTERCEPTION

Henri G. Busignies, Forest Hills, N. Y., assignor to International Standard Electric Corporation, New York, N. Y., a corporation of Delaware Application July 17, 1941, Serial No. 402,777

1 Claim. (Cl. 250—20)

This invention relates to apparatus for intercepting messages sent by radio when the frequency of transmission is not known in advance.

An object of the invention is the provision of apparatus for continuously surveying one or more bands of frequencies within which it is anticipated that a station under observation will transmit, for quickly detecting when such station is transmitting, and for giving a visual indication of its frequency. Means may also be provided for ascertaining the direction of the transmitting station.

According to the invention, a variable tuning device of a radio receiver fed from an antenna is automatically actuated to cause the receiver to explore a band of frequencies continuously, and means is provided for giving a visual indication on the screen of a cathode ray oscillograph tube which will enable an operator to detect at once a new transmitting station, to read its frequency and, if desired, to take its direction. The spot on the screen of the cathode ray tube is caused to describe a trace cyclically at a speed related to the speed at which the receiver explores the frequency band, and the output of the receiver causes the spot to deviate from its normal path at the instants when the receiver is tuned to an incident wave.

Further objects and features of the invention will be apparent from the following detailed description in connection with the accompanying drawing, in which Fig. 1 is a schematic diagram showing one embodiment of my invention; Fig. 2 shows an alternative arrangement for operating a cathode ray oscilligraph tube to cause it to provide a visual indication of the frequency of a transmitting station; and Fig. 3 shows an alternative receiver arrangement.

Referring to Fig. 1, the wave collector comprises a pair of crossed loops 1, 2 and a non-directional sense antenna 3. The crossed loops are connected to the stator windings 4, 5 and 6, 7 of a Bellini-Tosi goniometer, the search coil 8 of which is rotatable on a shaft 9 and is connected to the sense finding coupling circuit 10 to which is also connected the sense antenna 3. The lower end of the shaft 9 carries a pointer 11 which moves over a scale 12. The coupling circuit 10 feeds into a receiver 13 at the output of which the rectified carrier of a signal, suitably amplified, creates a direct current voltage at the terminals of a resistance 14.

It is to be understood, that in place of crossed loops, pairs of spaced vertical dipoles or pairs of spaced horizontal loops may be employed.

The tuning condenser 15 or other tuning unit of the receiver 13 is arranged to be rotated continuously by a synchronous electric motor 16 through a shaft 17 so that the receiver periodically, say 30 times per second, explores a given frequency band. The motor 16 also drives a two-phase alternator 18 one phase of which feeds one pair of deflector plates 19, 20 of a cathode ray oscillograph tube 23 and the other phase of which feeds the other pair of plates 21, 22.

The output circuit of the receiver 13 is arranged so that in the absence of incident waves of the frequency to which the receiver is tuned, a fixed potential is obtained across resistance 14, but the presence of signal waves results in a reduction of this potential. The potential across the resistance 14 is applied over conductors 24, 25 to deflecting cones 26, 27 located in the oscillograph tube 23 in the path of the beam.

A translucent frequency scale 29 is mounted at right-angles to the screen 28 of the oscillograph tube 23. A very thin film 30 is interposed between the scale 29 and screen 28 whereby parallax errors are avoided. When a lamp 31 is energized and the screen 28 is viewed through a viewing frame 32, an image of the scale 29 is reflected upon the screen 28. The scale 29 may be rotated to adjust its reflection accurately on the screen with respect to a reference frequency generated by a test oscillator.

The rotating field set up by the two-phase potentials applied to the plates 19, 20, 21, 22 causes the spot on the fluorescent screen 28 to describe, in the absence of incident signal waves, a circular trace. In the presence of incident signals, the potential across the deflecting cones 26, 27 is reduced, the beam is deflected to a lesser degree and the spot on the screen 28 comes back towards the centre of the screen at points on the frequency scale corresponding to the frequency of incident waves within the band explored by the receiver 13. On account of the persistence of vision, if the motor 16 rotates at a sufficiently high speed the frequency of a number of transmissions may be observed simultaneously.

Since the condenser 15 will normally only progressively vary the tuning of the receiver 13 over 180° of rotation of its shaft, means should be provided for blacking out one half of the oscillograph screen. This may be effected by mounting on the shaft 17 a semi-circular cam 34 which actuates contacts 35 to apply a potential to a focussing electrode 36 in the oscillograph tube 23 only during 180° of each rotation of the shaft of condenser 15. Alternatively a suitable shutter 33 may be provided to obscure one half of the screen. If desired, the frequency scale may be made to occupy the whole of the screen 28 in which case the alternator 18 is rotated at double the speed of the condenser 15.

According to another modification shown in Fig. 3 in which the receiver 13 is adapted to explore two wave-bands simultaneously, the contacts 35 are used to effect wave-band switching, so that during one half of a revolution of the shaft 17 the condenser 15 explores one wave-band and during the remaining half-revolution it explores the other wave-band. In this case two 180° scales are projected upon the screen 28.

A single phase alternator may be used in place of the two-phase alternator 18. In such an arrangement, the single phase voltage is applied directly to one pair of deflector plates 19, 20 and to the other pair of deflector plates 21, 22 through a 90° phase shift network.

According to a further modification shown in Fig. 2, the output current from the receiver 13 is fed over conductors 24, 25 to a pair of deflector coils 37, 38 adapted to be rotated around the neck of the oscillograph tube 23 by the motor 16 synchronously with the condenser 15. In this case the deflector plates 19, 20, 21, 22 and the cones 23, 27 may be dispensed with in the tube, and the alternator 18 also will not be needed. As in the arrangement of Fig. 1, in the absence of signals, the spot traces a circular path on the screen 28 but when signals are received, the spot moves towards the center of the screen at points corresponding to the frequency of the transmitting stations.

The direction of a station or stations under observation may be quickly obtained by rotating the goniometer search coil 8 by hand, noting the fade out of the indication or indications on the frequency scale and reading the bearing or bearings on the scale 12. The goniometer may also be used with advantage to differentiate between two or more transmissions on the same frequency, or in order to decrease the pick-up from a very strong station not under observation.

What is claimed is:

An arrangement for giving visual indication of the frequency of incident electromagnetic waves comprising a wave collecting device, a radio receiver including a rotatable tuning condenser for varying the tuning of said collecting device over a predetermined frequency band, means for rotating said condenser at a predetermined speed, a cathode ray tube having a fluorescent screen, means for causing a luminous spot on said screen to describe a circular trace corresponding to the frequencies in said predetermined frequency band at the speed of rotation of said condenser, a connection from the output of said receiver to beam deflecting means associated with said cathode ray tube to produce a deflection of said beam in response to received energy, control means for rendering said beam responsive to produce said luminous trace during 180° rotation of said condenser only, and means for blocking out said luminous spot over 180° of each rotation.

HENRI G. BUSIGNIES.